US009648220B2

(12) United States Patent
Ohtsuka

(10) Patent No.: US 9,648,220 B2
(45) Date of Patent: May 9, 2017

(54) IMAGING APPARATUS, IMAGING APPARATUS BODY AND IMAGE SOUND OUTPUT METHOD

(71) Applicant: Panasonic Intellectual Property Management Co., Ltd., Osaka (JP)

(72) Inventor: Yoshio Ohtsuka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/063,843

(22) Filed: Mar. 8, 2016

(65) Prior Publication Data

US 2016/0286143 A1    Sep. 29, 2016

(30) Foreign Application Priority Data

Mar. 27, 2015 (JP) ................................. 2015-065873
Jan. 12, 2016 (JP) ................................. 2016-003145

(51) Int. Cl.
*H04N 5/232* (2006.01)
*H04N 1/00* (2006.01)

(52) U.S. Cl.
CPC ..... *H04N 5/23209* (2013.01); *H04N 5/23216* (2013.01); *H04N 5/23245* (2013.01); *H04N 5/23296* (2013.01); *H04N 1/00127* (2013.01); *H04N 5/23293* (2013.01)

(58) Field of Classification Search
CPC .............. H04N 5/23293; H04N 5/772; H04N 5/23245; H04N 5/77; H04N 5/23203; H04N 5/765; H04N 5/2353; H04N 5/2253–5/2254; H04N 5/3575; H04N 5/372; H04N 1/00204; H04N 1/00127; H04N 1/00307; H04N 1/00283; H04N 1/00408; H04N 1/00413; H04N 1/00427; H04N 2201/0015; H04N 2201/0039; H04N 2201/0044; H04N 2201/0087
USPC ....................................................... 348/207.1
See application file for complete search history.

(56) References Cited

U.S. PATENT DOCUMENTS

| 5,903,700 A * | 5/1999 | Fukushima | ............... | H04N 5/77 386/239 |
| 7,486,314 B2 * | 2/2009 | Shibutani | ............... | H04N 5/772 348/231.1 |
| 8,077,243 B2 * | 12/2011 | Morita | ............... | G06F 3/0483 348/333.01 |

(Continued)

FOREIGN PATENT DOCUMENTS

JP    2013-174635    9/2013

*Primary Examiner* — Michael Osinski
(74) *Attorney, Agent, or Firm* — Wenderoth, Lind & Ponack, L.L.P.

(57) ABSTRACT

A digital camera includes an optical system including a focus lens, a zoom lens and a diaphragm, an HDMI output terminal configured to output sound collected by a microphone unit and a picture imaged by a CCD image sensor to an external recorder, and a controller. The controller controls switching between a moving image priority mode and a still image priority mode in which the optical system is driven at a higher speed than a speed in a moving image priority mode. In addition, the controller allows change to a moving image imaging mode by an operation unit when detecting that output to the external recorder is possible in the HDMI output terminal.

6 Claims, 7 Drawing Sheets

(56) References Cited

U.S. PATENT DOCUMENTS

| | | | | |
|---|---|---|---|---|
| 8,797,412 B2* | 8/2014 | Tokunaga | H04N 1/00925 | 348/207.1 |
| 9,001,217 B2* | 4/2015 | Kinoshita | H04N 5/23293 | 348/207.11 |
| 9,224,428 B2* | 12/2015 | Sekiguchi | G11B 27/322 | |
| 9,256,280 B2* | 2/2016 | Hashimoto | H04N 1/00204 | |
| 9,392,244 B2* | 7/2016 | Omori | H04N 9/79 | |
| 2001/0022624 A1* | 9/2001 | Tanaka | H04N 1/00137 | 348/333.02 |
| 2001/0041056 A1* | 11/2001 | Tanaka | G06F 17/30265 | 386/224 |
| 2004/0061797 A1* | 4/2004 | Takahashi | H04N 1/00283 | 348/333.01 |
| 2006/0023069 A1* | 2/2006 | Saito | H04N 5/23293 | 348/207.99 |
| 2006/0244833 A1* | 11/2006 | Abe | H04N 1/00347 | 348/207.1 |
| 2007/0065117 A1* | 3/2007 | Ikehata | G11B 31/006 | 386/224 |
| 2009/0089850 A1* | 4/2009 | Nakajima | H04N 5/775 | 725/118 |
| 2009/0269039 A1* | 10/2009 | Ohashi | G11B 31/006 | 386/224 |
| 2010/0020183 A1* | 1/2010 | Kimoto | H04N 1/00283 | 348/207.11 |
| 2010/0129049 A1* | 5/2010 | Hasegawa | H04N 5/77 | 386/278 |
| 2010/0149377 A1* | 6/2010 | Shintani | H04N 5/232 | 348/231.5 |
| 2010/0271491 A1* | 10/2010 | Yasuda | H04N 1/00278 | 348/207.1 |
| 2010/0277608 A1* | 11/2010 | Kitamori | H04N 5/772 | 348/222.1 |
| 2011/0138444 A1* | 6/2011 | Kang | G06F 21/31 | 726/3 |
| 2012/0182203 A1* | 7/2012 | Yoshikawa | G06F 3/1423 | 345/1.3 |
| 2012/0262585 A1* | 10/2012 | Nakano | H04N 5/765 | 348/207.1 |
| 2012/0307091 A1* | 12/2012 | Yumiki | H04N 5/23203 | 348/211.4 |
| 2013/0010133 A1* | 1/2013 | Fujita | H04N 5/765 | 348/207.11 |
| 2013/0027570 A1* | 1/2013 | Kinoshita | H04N 5/23293 | 348/207.1 |
| 2013/0100306 A1* | 4/2013 | Bekiares | G08B 13/19689 | 348/211.99 |
| 2013/0202272 A1* | 8/2013 | Minoshima | H04N 5/772 | 386/278 |
| 2013/0278484 A1* | 10/2013 | Hwang | G06F 3/1423 | 345/2.3 |
| 2014/0044414 A1* | 2/2014 | Minoshima | H04N 5/91 | 386/284 |
| 2014/0078244 A1* | 3/2014 | Kitazawa | H04N 7/147 | 348/14.08 |
| 2014/0178039 A1* | 6/2014 | Sekiguchi | G11B 27/322 | 386/241 |
| 2014/0215234 A1* | 7/2014 | Hayashi | G06F 1/32 | 713/310 |
| 2014/0240575 A1* | 8/2014 | Kaneda | H04N 5/23293 | 348/333.01 |
| 2015/0092069 A1* | 4/2015 | Furuyama | H04N 5/232 | 348/208.99 |
| 2015/0116522 A1* | 4/2015 | Tsunoda | H04N 9/8042 | 348/211.2 |
| 2015/0181130 A1* | 6/2015 | Wada | H04N 5/23245 | 348/208.12 |
| 2015/0319354 A1* | 11/2015 | Ichikawa | G03B 15/00 | 348/211.2 |
| 2015/0350520 A1* | 12/2015 | Yamashita | G06F 21/36 | 348/207.11 |
| 2016/0105632 A1* | 4/2016 | Endo | G11B 27/005 | 386/225 |
| 2016/0132840 A1* | 5/2016 | Bowles | G06Q 30/0278 | 705/306 |
| 2016/0173810 A1* | 6/2016 | Nakagawa | H04N 5/772 | 386/225 |
| 2016/0182785 A1* | 6/2016 | Ogata | H04N 5/2254 | 348/311 |
| 2016/0269648 A1* | 9/2016 | Hayashi | H04N 5/23203 | |
| 2016/0277676 A1* | 9/2016 | Nara | H04N 1/00127 | |
| 2016/0360082 A1* | 12/2016 | Nakao | H04N 5/23245 | |

* cited by examiner

IMAGING APPARATUS, IMAGING APPARATUS BODY AND IMAGE SOUND OUTPUT METHOD

BACKGROUND

1. Technical Field

The present disclosure relates to an imaging apparatus capable of outputting an image imaged and sound collected to an external apparatus.

2. Description of Related Art

A digital camera having a moving image imaging function has become popular. The digital camera having the moving image imaging function records sound simultaneously with a moving image. In Unexamined Japanese Patent Publication No. 2013-174635, there is disclosed a digital camera that does not perform wobbling when it is set to a moving image mode, in a digital camera including an auto-focus function.

SUMMARY

In the imaging apparatus capable of imaging an moving image, there is a problem that, when the image imaged and the sound collected are output to the external apparatus, noise due to lens driving of the imaging apparatus is mixed with the sound output.

An imaging apparatus of the present disclosure, in an imaging apparatus capable of outputting an image and sound to an external apparatus, includes: an optical system including a focus lens, a zoom lens, and a diaphragm; an imaging element configured to image an object image formed by the optical system; a microphone capable of collecting sound; an external output unit configured to output a picture imaged by the imaging element and sound collected by the microphone to the external apparatus; an operation unit configured to receive an input relating to operation; and a controller. The controller controls switching between a first imaging mode in which the optical system is driven and a second imaging mode in which the optical system is driven at a higher speed than a speed in the first imaging mode. In addition, the controller allows change to the first imaging mode by the operation unit when detecting that output to the external apparatus is possible in the external output unit.

With the imaging apparatus of the present disclosure, when the image imaged and the sound collected are output to the external apparatus, it is possible to reduce noise due to lens driving of the imaging apparatus that is mixed with the sound.

DETAILED DESCRIPTION

Exemplary embodiments will be described in detail below with appropriate reference to the drawings. However, an unnecessarily detailed description may be omitted. For example, a detailed description of an already well known matter and a duplicate description for substantially the same configuration may be omitted. This is to avoid the description below is unnecessarily redundant, and to facilitate understanding of those skilled in the art.

Incidentally, accompanying drawings and the description below are provided so that those skilled in the art sufficiently understand the present disclosure, and are not intended to limit the claimed subject matter.

Incidentally, in the following exemplary embodiment, a digital camera will be described as an example of an imaging apparatus.

First Exemplary Embodiment

Figure 1:
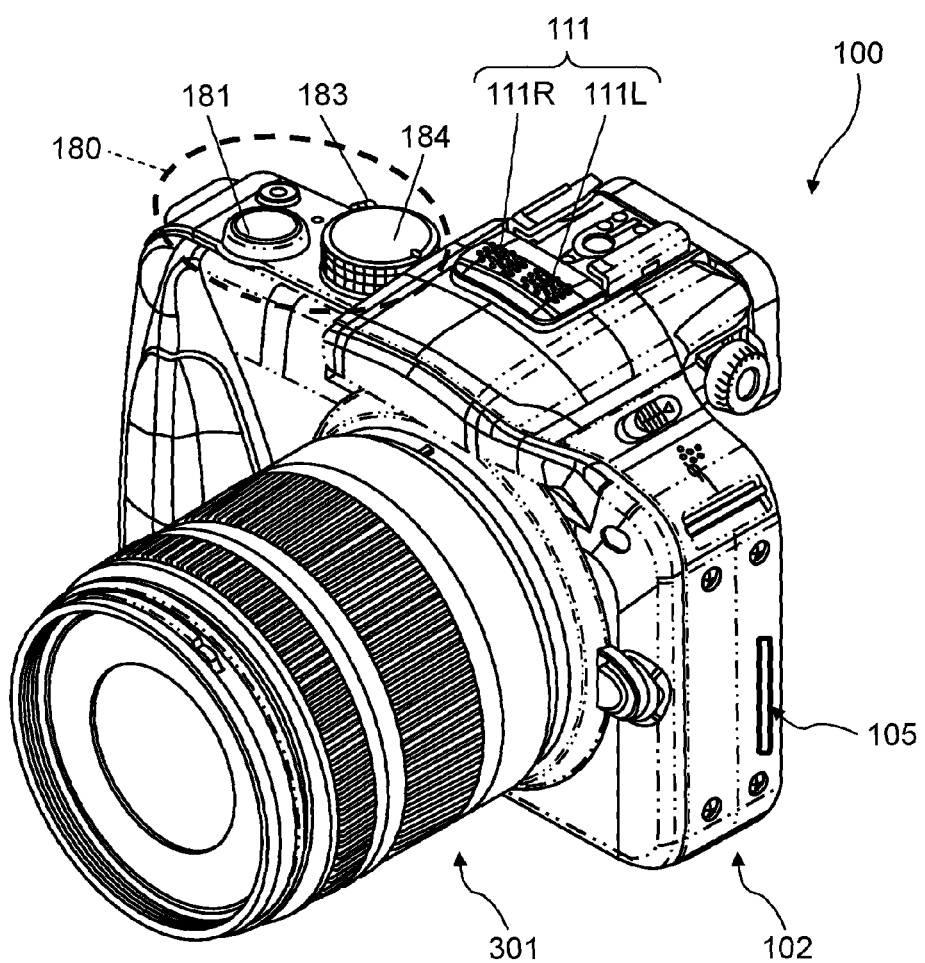
FIG. 1 is a front perspective view of a digital camera according to a first exemplary embodiment.

FIG. 1 is a front perspective view of digital camera 100 according to a first exemplary embodiment. Digital camera 100 (one example of an imaging apparatus) of the first exemplary embodiment includes microphone unit 111, and collects sound with microphone unit 111 during imaging of a moving image to perform sound recording as well as image recording. A configuration and operation of digital camera 100 will be described below.

1. Configuration

[1-1. Configuration of Digital Camera 100]

Digital camera 100 includes digital camera body 102 (one example of an imaging apparatus body) and interchangeable lens 301. In addition, digital camera 100, on a top face thereof, includes release button 181, power switch 183, and mode dial 184. Release button 181, power switch 183, and mode dial 184 configure operation unit 180.

In addition, digital camera 100, on the top face thereof, includes microphone unit 111. Microphone unit 111 includes two microphones of microphone 111L and microphone 111R. Microphone 111L and microphone 111R are located side by side in a left-right direction on a top face of digital camera body 102.

In addition, digital camera 100 includes HDMI (registered trademark) output terminal 105 at a side face of digital camera body 102.

Figure 2:
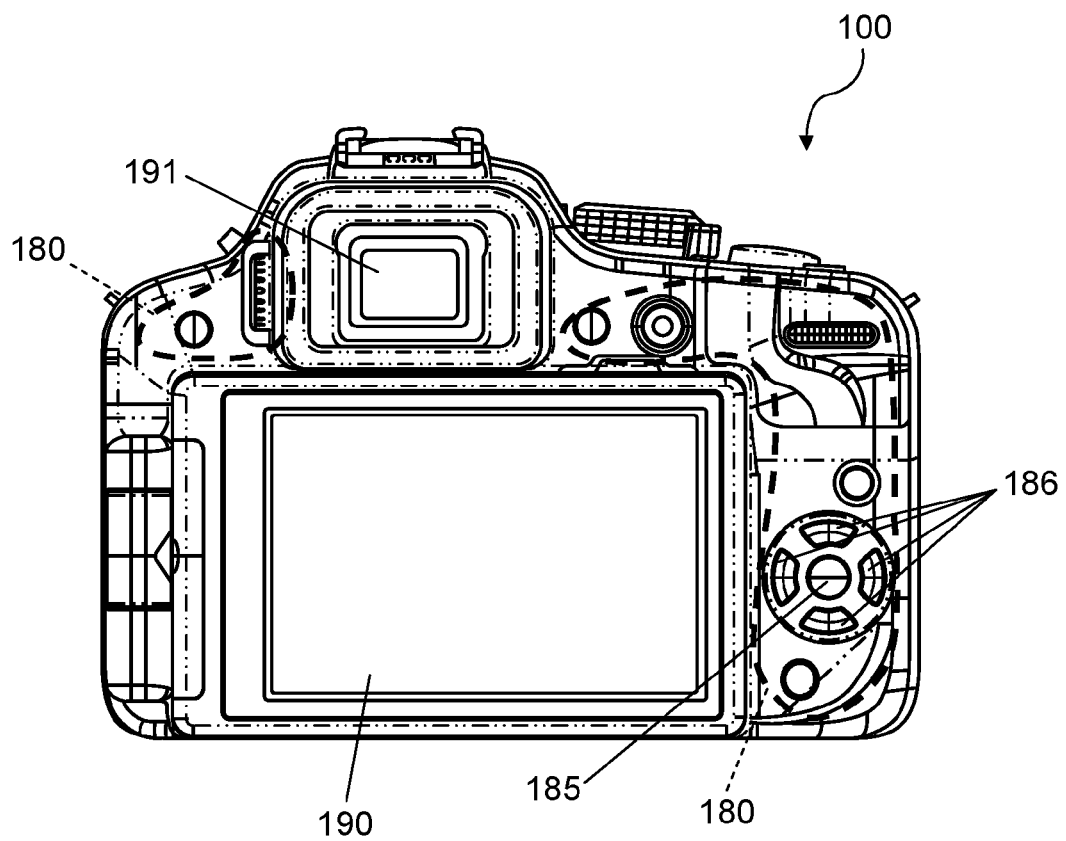
FIG. 2 is a rear view of the digital camera according to the first exemplary embodiment.

FIG. 2 is a rear face configuration diagram of digital camera 100 according to the first exemplary embodiment. Digital camera 100, on a rear face thereof, includes center button 185 and cross button 186. Center button 185 and cross button 186 configure operation unit 180. In addition, digital camera 100, on the rear face thereof, includes display 190 and view finder 191.

Figure 3:
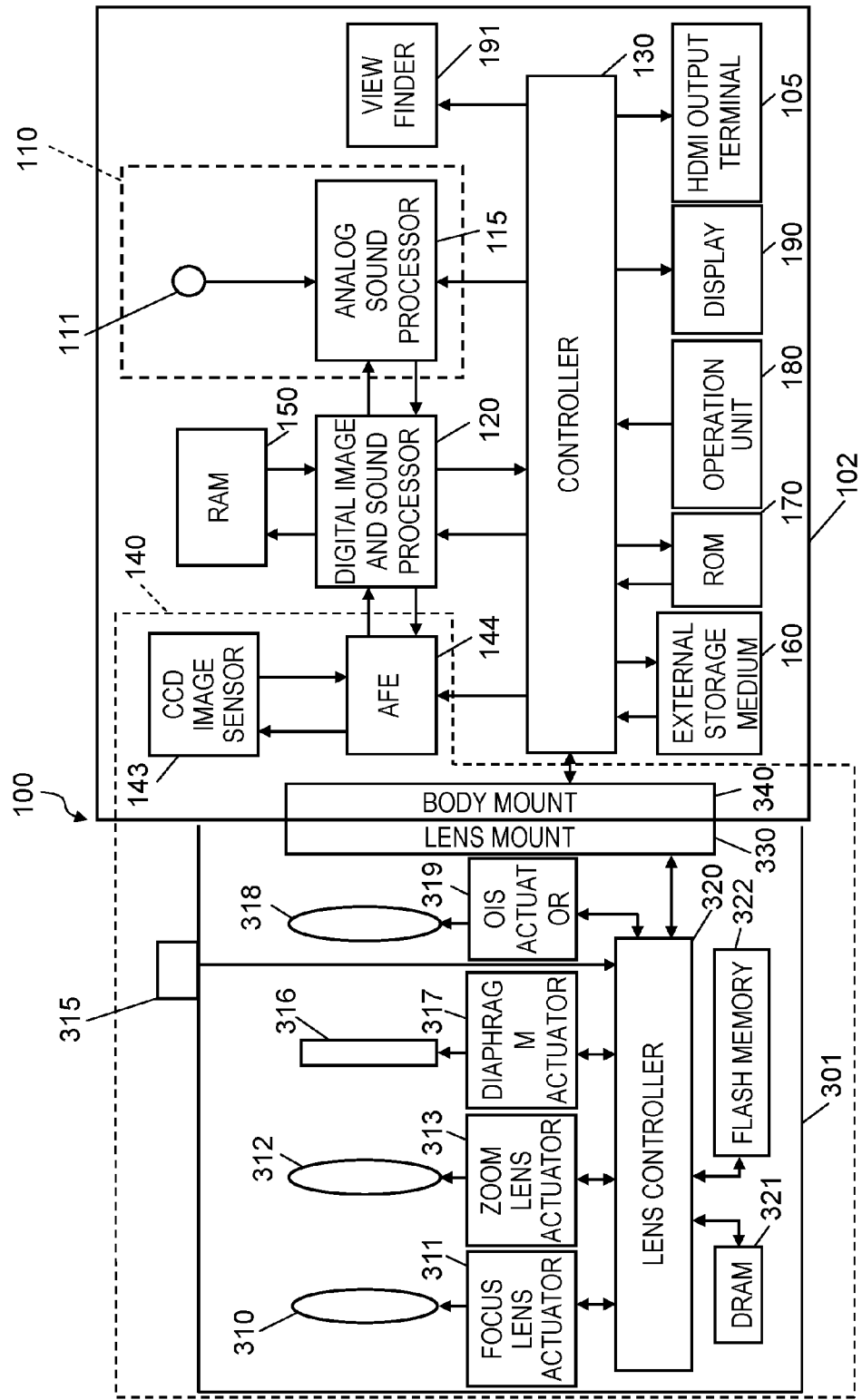
FIG. 3 is a block diagram illustrating an electrical configuration of the digital camera according to the first exemplary embodiment.

FIG. 3 is a block diagram illustrating an electrical configuration of digital camera 100 according to the first exemplary embodiment. Digital camera 100 includes interchangeable lens 301 and digital camera body 102.

Interchangeable lens 301 is an optical system having a plurality of lenses. Interchangeable lens 301 includes lens controller 320, lens mount 330, an optical system including focus lens 310 and zoom lens 312, focus lens actuator 311, zoom lens actuator 313, diaphragm 316, diaphragm actuator 317, operation ring 315, OIS (Optical Image Stabilization) lens 318, OIS actuator 319, DRAM 321, and flash memory 322. OIS is one of functions for optically correcting a blur of an image generated by a hand movement during imaging and the like. An OIS lens is a lens for implementing the function.

Digital camera body 102 includes CCD (Charge Coupled Device) image sensor 143, AFE (Analog Front End) 144, sound input system 110, digital image and sound processor 120, controller 130, RAM 150, external storage medium 160, ROM 170, operation unit 180, display 190, view finder 191, HDMI output terminal 105 (one example of an external output unit), and body mount 340.

Image input system 140 is configured by interchangeable lens 301, CCD image sensor 143 (one example of an imaging element), and AFE 144.

Hereinafter, details of each part illustrated in FIG. 1 to FIG. 3 will be described.

Lens controller 320 controls entire interchangeable lens 301. When operation ring 315 is operated by a user, lens controller 320 controls zoom lens actuator 313 to drive zoom lens 312. Lens controller 320 controls focus lens actuator 311 to drive focus lens 310. Lens controller 320 controls OIS actuator 319 to drive OIS lens 318 (one example of a correction lens). Lens controller 320 controls diaphragm actuator 317 to drive diaphragm 316.

For focus lens 310, zoom lens 312, OIS lens 318, and diaphragm 316 (hereinafter referred to as "the lenses and the diaphragm"), sound and vibration generated during driving increase when movements of the lenses and the diaphragm are fast, and the sound and vibration generated during the driving decrease when the movements of the lenses and the diaphragm are slow.

When a still image is imaged, not to miss a photo opportunity, it is desirable to make the movement of the lenses and the diaphragm fast to allow the lenses and the diaphragm to quickly follow a desired value. Such a lens control mode suitable for the still image is referred to as a "still image priority mode."

When a moving image is imaged, if the lenses and the diaphragm are quickly moved, a picture may become unnatural and generate incongruity, and the sound generated during the driving of the lenses and the diaphragm may be largely recorded. Therefore, when the moving image is imaged, it is desirable to make the movement of the lenses and the diaphragm slow to allow the lenses and the diaphragm to slowly follow a desired value. Such a lens control mode suitable for the moving image is referred to as a "moving image priority mode."

Incidentally, the moving image priority mode is one example of a first imaging mode according to the present disclosure, and the still image priority mode is one example of a second imaging mode according to the present disclosure.

For the above lens control, in the still image priority mode, the optical system is driven at a higher speed than a speed in the moving image priority mode. Here, the optical system is driven at a high speed means that at least one of focus lens 310, zoom lens 312, OIS lens 318, and diaphragm 316 included in the optical system is driven at the high speed. In addition, the high speed to be driven at means a relative speed in a case of comparing the same members in different modes with each other. For example, in the still image priority mode, when focus lens 310 is driven at a higher speed than a speed in the moving image priority mode, it means that focus lens 310 in the still image priority mode is driven at a higher speed than a speed of focus lens 310 in the moving image priority mode.

Lens controller 320 is connected to DRAM 321 and flash memory 322, and is able to write/read information to/from DRAM 321 and flash memory 322 as required. In addition, lens controller 320 is able to communicate with controller 130 via lens mount 330. Incidentally, controller 130 can be configured by a hard-wired electronic circuit, and can be configured by a microcomputer and the like that use a program.

Lens mount 330, coupled with body mount 340 included in digital camera body 102, is a connecting member for mechanically and electrically connecting interchangeable lens 301 and digital camera body 102 with each other. When interchangeable lens 301 and digital camera body 102 are mechanically and electrically connected with each other, lens controller 320 and controller 130 are in a state in which they are capable of communicating with each other.

DRAM 321 is used as a work memory in various types of control by lens controller 320. In addition, flash memory 322 stores a program, a parameter, lens data, and the like used in the various types of control by lens controller 320.

Focus lens 310 is a lens for changing a focus state of an object image that enters an optical system of interchangeable lens 301 to be formed on CCD image sensor 143. A lens configuration of focus lens 310 can be any number of lenses and groups. Focus lens actuator 311 drives focus lens 310 to move forward and backward along an optical axis of the optical system, based on a control signal notified from lens controller 320. Incidentally, focus lens actuator 311 can be implemented by, for example, a stepping motor, a DC motor, an ultrasonic motor and the like.

Zoom lens 312 is a lens for changing magnification of the object image formed by the optical system of interchangeable lens 301. A lens configuration of zoom lens 312 can be any number of lenses and groups. Zoom lens actuator 313 drives zoom lens 312 to move forward and backward along the optical axis of the optical system, based on the control signal notified from lens controller 320. Incidentally, zoom lens actuator 313 can be implemented by, for example, a stepping motor, a DC motor, an ultrasonic motor and the like.

OIS lens 318 is a lens for correcting a blur of an object image formed by the optical system of interchangeable lens 301. Specifically, OIS lens 318 corrects the blur of the object image generated by a shake of digital camera 100. OIS lens 318 decreases a relative shifting between the object image and CCD image sensor 143 by moving in a direction to cancel the shake of digital camera 100. Specifically, OIS lens 318 decreases the blur of the object image on CCD image sensor 143 by moving in the direction to cancel the shake of digital camera 100. OIS lens 318 is configured by one or more lenses. OIS actuator 319 drives OIS lens 318 in a plane vertical to the optical axis of the optical system.

Diaphragm 316 is configured to be capable of opening and closing a plurality of mechanical blades. Diaphragm 316 is an adjustment member that is able to adjust an amount of light that enters the optical system of interchangeable lens 301. Diaphragm actuator 317 drives to change an opening and closing state of the mechanical blades of diaphragm 316, based on the control signal notified from lens controller 320. Incidentally, diaphragm actuator 317 can be implemented by, for example, a stepping motor, a DC motor, an ultrasonic motor and the like.

Operation ring 315 is an operation member included in an outer surface of interchangeable lens 301. Operation ring 315 is configured to rotate relatively to interchangeable lens 301. A rotational position and a rotational speed of operation ring 315 are detected by a detector not illustrated to notify lens controller 320. Lens controller 320 is able to provide a driving control signal to an actuator of zoom lens 312, based on the rotational position and the rotational speed of operation ring 315 notified. When operation ring 315 is operated, lens controller 320 provides the driving control signal to zoom lens actuator 313 to drive zoom lens 312.

Body mount 340, coupled with lens mount 330 included in interchangeable lens 301, is a connecting member for mechanically and electrically connecting interchangeable lens 301 and digital camera body 102 with each other. When interchangeable lens 301 and digital camera body 102 are mechanically and electrically connected with each other, lens controller 320 and controller 130 are in the state in which they are capable of communicating with each other. Body mount 340 notifies lens controller 320 via lens mount 330 of an exposure synchronization signal and the other control signal received from controller 130. In addition, body mount 340 notifies controller 130 of a signal received from lens controller 320 via lens mount 330.

CCD image sensor 143 images the object image formed through interchangeable lens 301 to generate image information. CCD image sensor 143, when digital camera 100 is in an imaging mode, is able to generate the image information of a new frame for every predetermined time. Incidentally, in the present exemplary embodiment, although CCD image sensor 143 is used as the imaging element, the imaging element can be the other imaging element, such as a CMOS (Complementary Metal Oxide Semiconductor) image sensor, and an NMOS (Negative channel Metal Oxide Semiconductor) image sensor.

AFE 144 performs noise suppression by correlated double sampling, amplification to input range width of an A/D converter by an analog gain controller, A/D conversion by the A/D converter, to the image information read from CCD image sensor 143. After that, AFE 144 outputs the image information to digital image and sound processor 120.

Sound input system 110 includes microphone unit 111 and analog sound processor 115. Microphone unit 111 includes microphones 111L, 111R. Microphone unit 111 converts a sound signal to an electric signal by each of the microphones to input to analog sound processor 115. Analog sound processor 115 performs A/D conversion to the sound signal processed by the A/D converter to output to digital image and sound processor 120.

Digital image and sound processor 120 performs various types of processing to the image information output from AFE 144 and the sound signal output from analog sound processor 115. For example, digital image and sound processor 120, according to an instruction from controller 130, performs gamma correction and white balance correction, flaw correction, encoding processing, and the like, to the image information. In addition, digital image and sound processor 120, according to the instruction from controller 130, performs various types of processing to the sound signal. Digital image and sound processor 120 can be implemented by a hard-wired electronic circuit, and can be implemented by a microcomputer and the like that execute a program. Digital image and sound processor 120 can be implemented as one semiconductor chip integrally with controller 130 and the like.

Display 190 is disposed on the rear face of digital camera 100. In the present exemplary embodiment, display 190 is a liquid crystal display.

Display 190 displays an image based on the image information processed in digital image and sound processor 120. The image displayed by display 190 includes a through image, a reproduction image, a control selection screen, a warning screen, a power end screen and the like.

The through image is an image of the frame to be newly generated continuously for every predetermined time by CCD image sensor 143. Normally, digital camera 100 is set in the imaging mode. Digital image and sound processor 120, when being in a standby state in which still image imaging is not performed or in a moving image imaging state, generates the through image from the image information generated by CCD image sensor 143. The user is able to image an object while checking composition of the object by referring to the through image displayed on display 190.

The reproduction image is generated by digital image and sound processor 120 when digital camera 100 is in the reproduction mode. The reproduction image is an image in which a high pixel recorded image recorded in external storage medium 160 and the like is reduced to a low pixel to fit a size of display 190. High pixel image information to be recorded in external storage medium 160 is generated by digital image and sound processor 120, based on the image information generated by CCD image sensor 143 after release button 181 receives predetermined operation by the user.

The control selection screen includes a menu screen for the user to select and determine various settings, and a mode selection screen displayed when an external device is connected to HDMI output terminal 105. The menu screen is displayed when, for example, the user operates operation unit 180 during through image display. A detail of the mode selection screen is described later.

A mode is referred to as an imaging mode in which the still image or the moving image is imaged. A mode is referred to as a live mode in which display 190 displays the through image when the still image or the moving image is not imaged. A mode is referred to as a reproduction mode in which display 190 displays the reproduction image. A mode is referred to as a menu mode in which display 190 displays the menu screen. A display content displayed by display 190 can be displayed by view finder 191.

Controller 130 comprehensively controls entire operation of digital camera 100. Controller 130 detects that HDMI cable 420 described later is inserted into HDMI output terminal 105. In addition, controller 130 detects that HDMI cable 420 inserted into HDMI output terminal 105 is connected to the external device such as external recorder 400 described later and communication has been established. Details of HDMI cable insertion detection and external device connection communication detection by controller 130 are described later. Controller 130 can be implemented by a hard-wired electronic circuit, and can be implemented by a microcomputer and the like that execute a program. In addition, controller 130 can be implemented as one semiconductor chip integrally with digital image and sound processor 120 and the like.

ROM 170 stores a program for comprehensively controlling the entire operation of digital camera 100 other than programs relating to auto-focus control (AF control) and auto-exposure control (AE control), strobe light emission control and the like that are executed by controller 130. ROM 170 stores various conditions and settings relating to digital camera 100. In the present exemplary embodiment, ROM 170 is a flash ROM. Incidentally, ROM 170 does not need to exist outside controller 130 (as a separate body from controller 130), and can be incorporated inside controller 130.

RAM 150 functions as a work memory of digital image and sound processor 120 and controller 130. RAM 150 can be implemented by an SDRAM, a flash memory, and the like. RAM 150 also functions as an internal memory for recording image information and a sound signal, and the like.

External storage medium 160 is an external memory including a non-volatile recording unit such as a flash memory therein. External storage medium 160 is capable of recording data such as image information and sound signals processed by digital image and sound processor 120.

Operation unit 180 is a generic name of an operation interface such as an operation button and an operation dial that are disposed on an exterior of digital camera 100. Operation unit 180 receives operation by the user. For example, operation unit 180 includes release button 181, power switch 183, mode dial 184, center button 185, and cross button 186 that are illustrated in FIG. 1, FIG. 2, and FIG. 3. Operation unit 180, when receiving the operation by the user, notifies controller 130 of a signal that instructs various types of operation.

Release button 181 is a press-type button that transits to two stages of a half-pressed state and a full-pressed state. When release button 181 is half-pressed by the user, controller 130 executes the AF (Auto Focus) control and/or the AE (Auto Exposure) control to determine imaging conditions.

Subsequently, when release button 181 is full-pressed by the user, controller 130 records the image information imaged at the timing of the full-press in external storage medium 160 and the like.

Power switch 183 is a slide-type switch for turning ON/OFF power supply to each part of digital camera 100. When power switch 183 is slid to the right by the user when the power is turned OFF, controller 130 supplies the power to each part of digital camera 100 to activate each part. When power switch 183 is slid to the left by the user when the power is turned ON, controller 130 stops the power supply to each part of digital camera 100.

Mode dial 184 is a rotary-type dial. When mode dial 184 is rotated by the user, controller 130 switches an operation mode of digital camera 100 to an operation mode corresponding to a current rotational position of mode dial 184. The operation mode includes, for example, an auto-imaging mode, a manual imaging mode, and a scene selection mode. Incidentally, the auto-imaging mode, the manual imaging mode, and the scene selection mode are collectively referred to as the imaging mode.

Center button 185 is a press-type button. When center button 185 is pressed by the user when digital camera 100 is in the imaging mode or the reproduction mode, controller 130 displays the menu screen on display 190. The menu screen is a screen for allowing the user to set various imaging conditions and reproduction conditions. When center button 185 is pressed in a state in which a value of a setting item of the various conditions is selected by the user on the menu screen, the setting item is determined to be the value. The setting determined is stored in ROM 170.

Cross button 186 includes four press-type buttons provided in up, down, left, and right directions. The user is able to select the value of the setting item of the various conditions displayed on the menu screen by pressing the button of any of the directions in cross button 186.

[1-2. Entire Configuration of Digital Camera 100 when Connected to External Apparatus]

Figure 4:
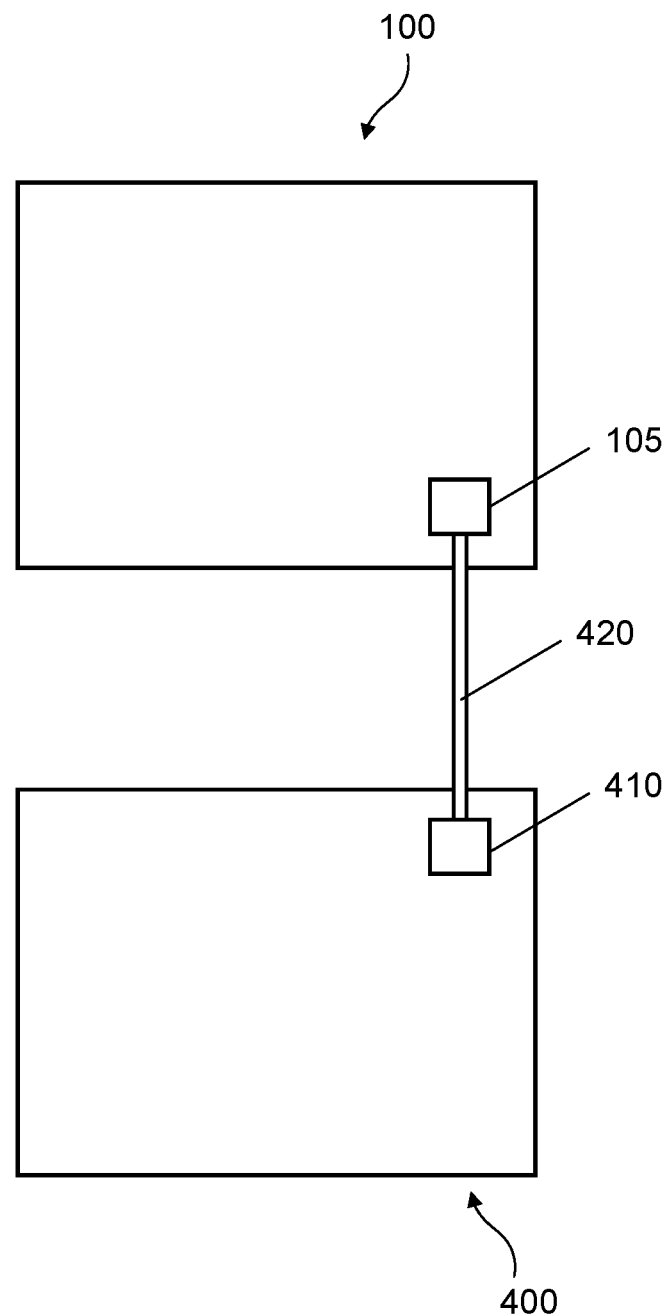
FIG. 4 is a block diagram illustrating an entire configuration of the digital camera and an external recorder that are connected together, according to the first exemplary embodiment.

FIG. 4 is a block diagram illustrating an entire configuration of digital camera 100 and external recorder 400 that are connected together, according to the first exemplary embodiment. External recorder 400 (one example of an external apparatus) includes HDMI input terminal 410 for receiving an HDMI input. When one end of HDMI cable 420 is connected to HDMI output terminal 105 of digital camera 100 and the other end of HDMI cable 420 is connected to HDMI input terminal 410 of external recorder 400, digital camera 100 is connected to external recorder 400 via HDMI cable 420.

2. Operation

Operation is described of digital camera 100 during HDMI connection with external recorder 400.

Figure 5:
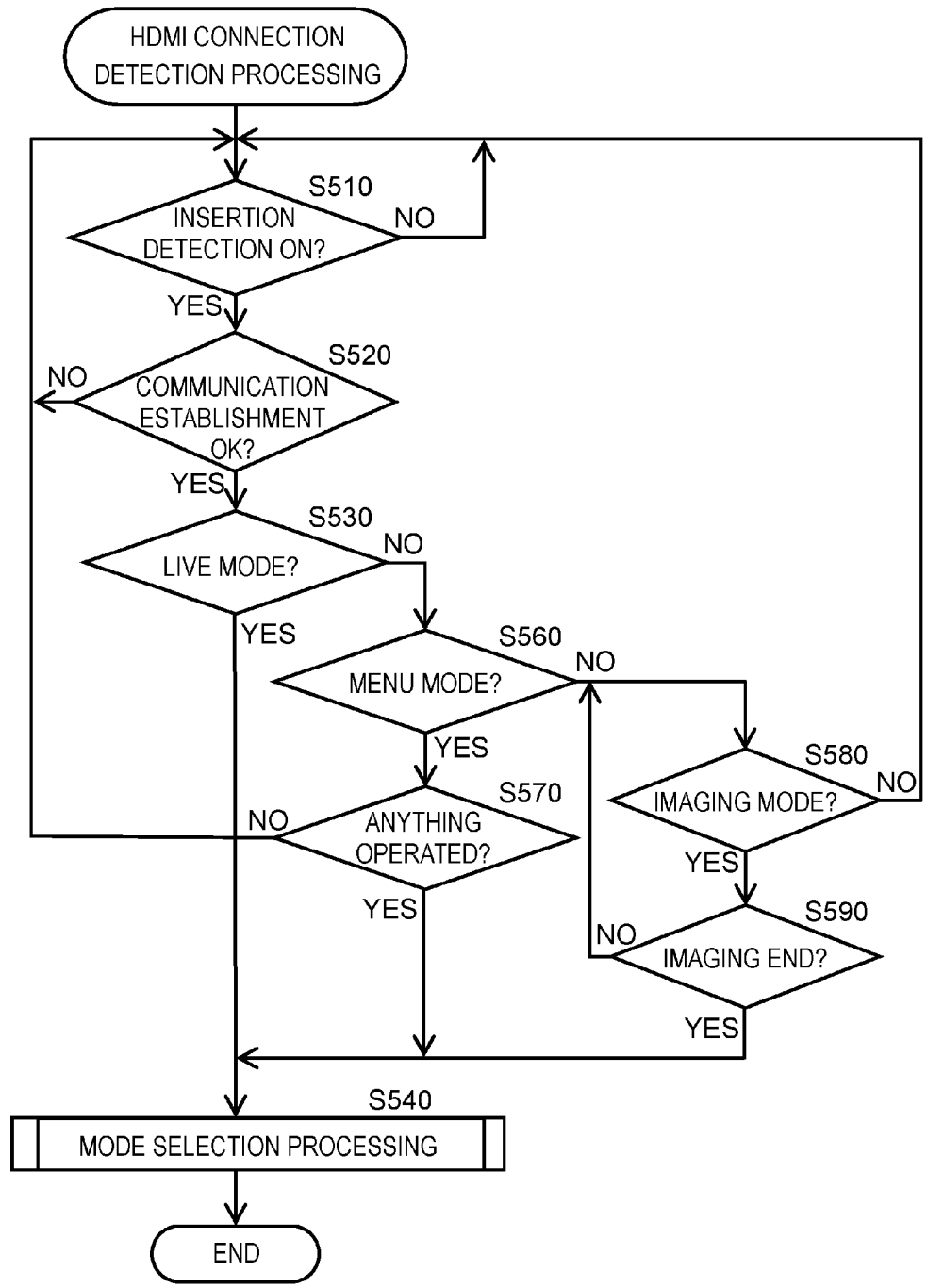
FIG. 5 is a flowchart illustrating a flow of operation in HDMI (registered trademark) connection detection processing of the digital camera according to the first exemplary embodiment.

FIG. 5 is a flowchart illustrating a flow of operation in HDMI connection detection processing of digital camera 100 according to the first exemplary embodiment.

In step S510, controller 130 determines whether or not HDMI cable 420 is inserted into HDMI output terminal 105. Specifically, controller 130 determines that HDMI cable 420 is inserted when, for example, it is detected that one end of HDMI cable 420 is physically inserted into HDMI output terminal 105. Detection of physical insertion is performed by detecting that, for example, HDMI cable 420 and HDMI output terminal 105 are electrically in contact with each other. When controller 130 determines that HDMI cable 420 is inserted into HDMI output terminal 105 (insertion detection ON), the processing proceeds to step S520. Otherwise, the processing remains in step S510 and does not proceed.

In step S520, controller 130 determines whether or not the communication is established between external recorder 400 and digital camera 100. Controller 130 determines that the communication is established when, for example, receiving an appropriate command to a command transmitted based on a predetermined transmission and reception sequence. When controller 130 determines that the communication is established between external recorder 400 and digital camera 100 (communication establishment OK), the processing proceeds to step S530. Otherwise, the processing proceeds to step S510.

Incidentally, in the present exemplary embodiment, controller 130 determines the connection between digital camera 100 and external recorder 400, and detects that output to external recorder 400 is possible, in the two steps of step S510 and step S520. That is, in step S510, controller 130 detects that the output to external recorder 400 is possible, by determining whether or not HDMI cable 420 is inserted into HDMI output terminal 105. In step S520, controller 130 detects that the output to external recorder 400 is possible, by determining whether or not the communication is established between external recorder 400 and digital camera 100. However, controller 130 can detect that the output to external recorder 400 is possible, by determining the connection by only one of the steps.

In step S530, controller 130 determines whether or not digital camera 100 is in the live mode. When controller 130 determines that digital camera 100 is in the live mode, the processing proceeds to step S540. Otherwise, the processing proceeds to step S560.

In step S560, controller 130 determines whether or not digital camera 100 is in the menu mode. When controller 130 determines that digital camera 100 is in the menu mode, the processing proceeds to step S570. Otherwise, the processing proceeds to step S580.

In step S570, controller 130 determines whether or not operation unit 180 receives any operation. When controller 130 determines that operation unit 180 receives any operation, the processing proceeds to step S540. Otherwise, the processing proceeds to step S510.

In step S580, controller 130 determines whether or not digital camera 100 is in the imaging mode. When controller 130 determines that digital camera 100 is in the imaging mode, the processing proceeds to step S590. Otherwise (for example, in the reproduction mode), the processing proceeds to step S510. In step S590, controller 130 determines whether or not the imaging mode of digital camera 100 is ended. When controller 130 determines that the imaging mode of digital camera 100 is ended, the processing proceeds to step S540. Otherwise, the processing proceeds to step S580.

In step S540, controller 130 performs mode selection processing. A detail of the mode selection processing is described later. When the mode selection processing is ended, the processing is ended.

Figure 6:
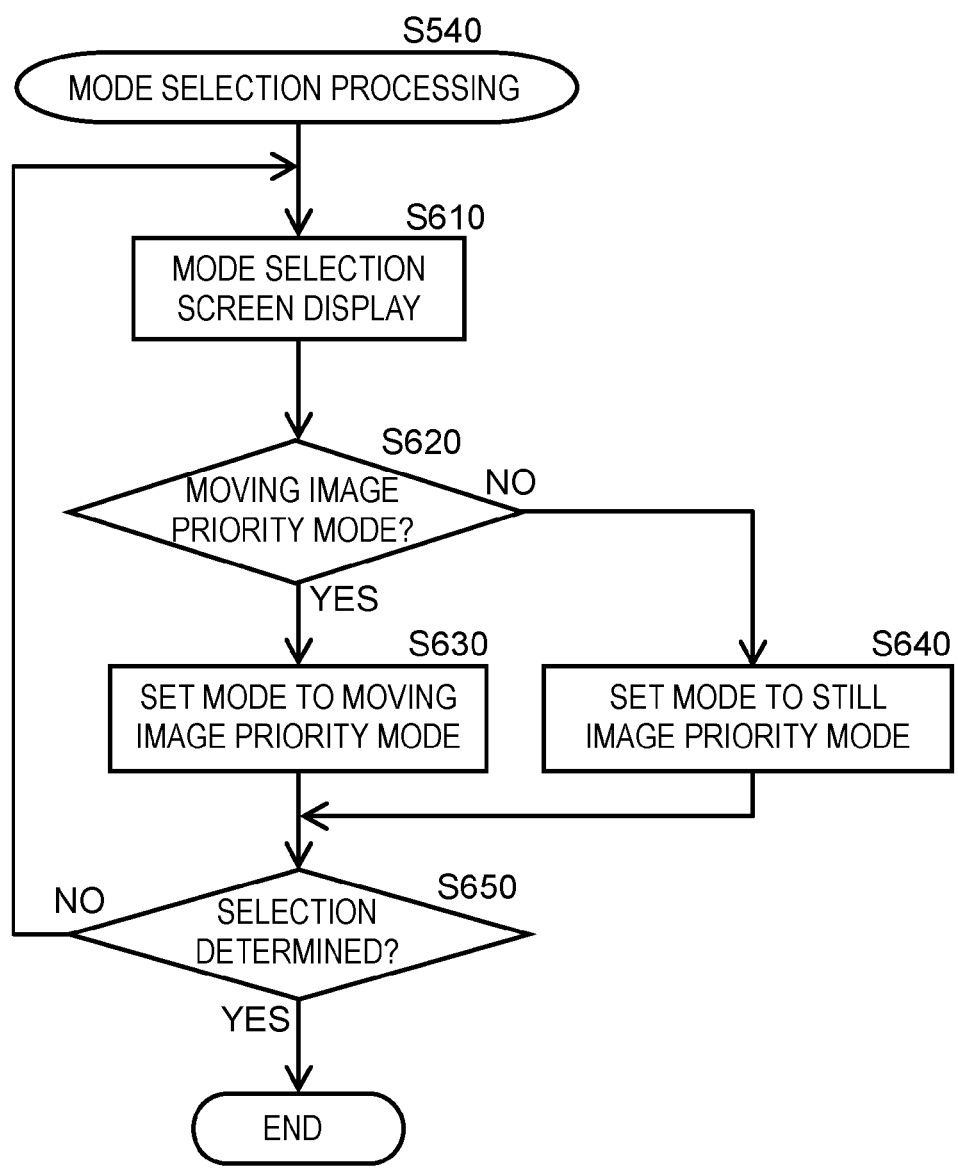
FIG. 6 is a flowchart illustrating a flow of operation in mode selection processing of the digital camera according to the first exemplary embodiment.

FIG. 6 is a flowchart illustrating a flow of operation in the mode selection processing of digital camera 100 according to the first exemplary embodiment. In mode selection processing step S540, first, the processing proceeds to mode selection screen display step S610. In mode selection screen display step S610, controller 130 displays the mode selection screen described later, and there are cases in which the mode selection screen is displayed on display 190, and in which the mode selection screen is displayed on screen view finder 191. When controller 130 displays the mode selection screen on display 190 or view finder 191, the processing proceeds to step S620.

In step S620, controller 130 determines whether or not digital camera 100 is in the moving image priority mode. The user, in the mode selection screen, is able to select and determine the mode of digital camera 100 to any one of the moving image priority mode and the still image priority mode. When controller 130 determines that the mode of digital camera 100 is the moving image priority mode, the processing proceeds to S630. In step S630, controller 130 sets the mode to the moving image priority mode, and then the processing proceeds to step S650.

In step S620, when controller 130 determines that the mode of digital camera 100 is not the moving image priority mode, that is, the mode is the still image priority mode, the processing proceeds to step S640. In step S640, controller 130 sets the mode to the still image priority mode, and then the processing proceeds to step S650.

In step S650, controller 130 determines whether or not the selection is determined of setting the mode to any one of the moving image priority mode and the still image priority mode. When controller 130 determines that the selection of the mode is determined, the mode selection processing is ended. Otherwise, the processing proceeds to step S610.

Figure 7:
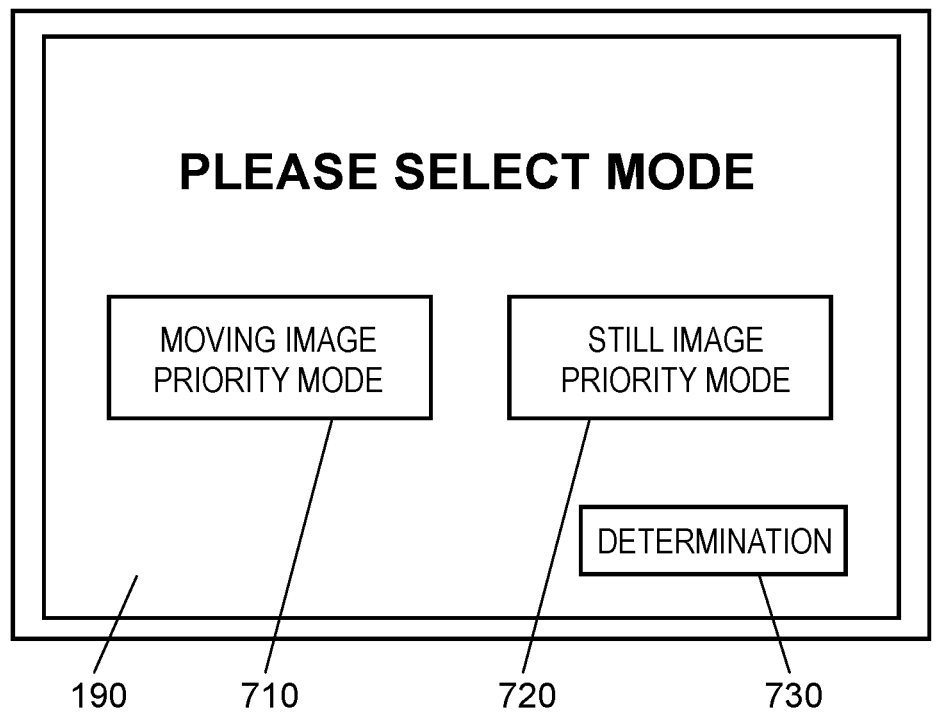
FIG. 7 is a diagram illustrating a mode selection screen of the digital camera according to the first exemplary embodiment.

FIG. 7 is a diagram illustrating the mode selection screen of digital camera 100 according to the first exemplary embodiment. As described above, controller 130, in mode selection processing step S540, displays the mode selection screen on display 190 or view finder 191. The user operates operation unit 180 to select moving image priority mode key 710 or still image priority mode key 720. As operation unit 180 to be operated by the user at this time, cross button 186 is appropriate, for example. When the user selects moving image priority mode key 710, controller 130 sets the mode of digital camera 100 to the moving image priority mode. Otherwise, controller 130 sets the mode of digital camera 100 to the still image priority mode (that is, an initial setting is the still image priority mode). When the user selects moving image priority mode key 710 or still image priority mode key 720 and then operates operation unit 180 to press determination key 730, controller 130 determines that the selection is determined of setting the mode to any one of the moving image priority mode and the still image priority mode, and the mode selection processing step S540 is ended.

3. Conclusion

Digital camera 100 of the present exemplary embodiment is digital camera 100 capable of outputting the image and sound to external recorder 400. Digital camera 100 includes the optical system, CCD image sensor 143, microphone unit 111, HDMI output terminal 105, operation unit 180, and controller 130. The optical system includes focus lens 310, zoom lens 312, and diaphragm 316. CCD image sensor 143 images the object image formed by the optical system. Microphone unit 111 is capable of collecting the sound. HDMI output terminal 105 outputs the picture imaged by CCD image sensor 143 and the sound collected by microphone unit 111 to external recorder 400. Operation unit 180 receives the input relating to the operation. Controller 130 controls the switching between the moving image priority mode in which focus lens 310, zoom lens 312, and diaphragm 316 are driven and the still image priority mode in which focus lens 310, zoom lens 312, and diaphragm 316 are driven at higher speeds than those in the moving image priority mode. In addition, controller 130 allows the change to the moving image imaging mode by operation unit 180 when detecting that the output to external recorder 400 is possible in HDMI output terminal 105.

Here, the state in which the output to external recorder 400 is possible is a state in which digital camera 100 detects that HDMI cable 420 is physically inserted into HDMI output terminal 105, or a state in which the communication is established between external recorder 400 and digital camera 100.

The user is able to perform the change to the moving image imaging mode by using operation unit 180. Thus, digital camera 100 is able to drive focus lens 310, zoom lens 312, and diaphragm 316 to allow them to slowly follow the desired value to reduce the sound generated during the driving. Therefore, digital camera 100 is able to reduce the noise that is due to driving of focus lens 310, zoom lens 312, and diaphragm 316 and collected by microphone unit 111, and to reduce the noise in the sound in external recorder 400 in which the picture and sound output from digital camera 100 are recorded.

Other Exemplary Embodiment

As described above, as an exemplification of a technique disclosed in the present application, the first exemplary embodiment has been described. However, the technique of the present disclosure is not limited thereto, and it is also possible to apply to an exemplary embodiment in which modification, replacement, addition, omission are appropriately performed.

Therefore, the other exemplary embodiment is exemplified below.

In the above exemplary embodiment, digital camera 100 including interchangeable lens 301 and digital camera body 102 has been described. Digital camera 100 is not limited to an interchangeable lens type, and can be a digital camera integrally configured with a lens. Digital camera 100 can be a digital camera configured to drive the lens and the like in two modes, a moving image priority mode and a still image priority mode, which are different in a driving speed.

In the above exemplary embodiment, the embodiment has been described that is connected to external recorder 400 as an external apparatus. The external apparatus is not limited to an external recorder, and can be, for example, a picture sound output apparatus such as a TV. In a case of viewing a picture and sound imaged by digital camera 100 in a larger screen TV, it is possible to reduce noise in the sound due to driving of the lens and the like.

In the above exemplary embodiment, the embodiment has been described that uses the HDMI for connection with external recorder 400. The connection with the external apparatus is not limited to the HDMI, and can be, for example, wireless connection or the SDI (Serial Digital Interface). That is, the connection can be any type that is able to output the image imaged and sound collected by digital camera 100 to the external apparatus.

In the above exemplary embodiment, the case has been described that uses cross button 186 as operation unit 180 in selection of the moving image priority mode or the still image priority mode. When display 190 is a touch panel, mode selection can be performed by touch panel operation. In addition, as a display screen, although the screen has been exemplified for selecting the moving image priority mode and the still image priority mode, a screen can be displayed for confirming whether or not a user performs switching to the moving image priority mode.

In the above exemplary embodiment, although the configuration has been described in which interchangeable lens 301 includes OIS lens 318 and OIS actuator 319, the interchangeable lens can be the one that does not include OIS lens 318 and OIS actuator 319. In this case, it is possible to reduce noise due to driving of focus lens 310, zoom lens 312, and diaphragm 316.

In the above exemplary embodiment, as an imaging apparatus including sound collecting apparatus, digital camera 100 has been described as an example. However, the imaging apparatus can be a device capable of imaging a moving image (sound recording). That is, the imaging apparatus can be a video camera.

In the above exemplary embodiment, as one of the functions for optically correcting the blur of the image generated by a hand movement and the like during imaging, OIS (Optical Image Stabilization, a type of moving lens in response to the hand movement) has been described as an example. However, the function for optically correcting the blur of the image generated by the hand movement and the like during the imaging can include BIS (Image Stabilization in the Body, a type of moving an imaging element in response to the hand movement).

For example, as a first modified example, a configuration is described that selects not only a mode of OIS control but also a mode of BIS control in "mode selection processing" of step S540 illustrated in FIG. 5 and FIG. 6.

In the first modified example, in step S630 illustrated in FIG. 6, controller 130 sets not only lens control but also imaging element control to the moving image priority mode. That is, in the moving image priority mode, during imaging of a moving image, controller 130 makes the movement of not only the lenses and the diaphragm but also the imaging element slow to allow them to slowly follow a desired value. In addition, in step S640, controller 130 sets not only the lens control but also the imaging element control to the still image priority mode. That is, in the still image priority mode, during imaging of a still image, not to miss a photo opportunity, controller 130 makes the movement of not only the lenses and the diaphragm but also the imaging element fast to allow them to quickly follow a desired value.

Next, as a second modified example, a configuration is described that selects the mode of the BIS control rather than the OIS control in "mode selection processing" of step S540 illustrated in FIG. 5 and FIG. 6 when the function for optically correcting the blur of the image includes the BIS. The second modified example can also be applied to an imaging apparatus not having a function of the OIS.

In the second modified example, in step S630 illustrated in FIG. 6, controller 130 sets the imaging element control rather than the lens control to the moving image priority mode. That is, in the moving image priority mode, during imaging of the moving image, controller 130 makes the movement of the imaging element slow to allow the imaging element to slowly follow a desired value. In addition, in step S640, controller 130 sets the imaging element control rather than the lens control to the still image priority mode. That is, in the still image priority mode, during imaging of the still image, not to miss a photo opportunity, controller 130 makes the movement of the imaging element fast to allow the imaging element to quickly follow a desired value.

The technique of the present disclosure can be applied to a digital camera, movie camera, and the like.

What is claimed is:

1. An imaging apparatus for outputting an image and sound to an external apparatus, the imaging apparatus comprising:
    an optical system including a focus lens, a zoom lens and a diaphragm;
    an imaging element configured to image an object image formed by the optical system;
    a microphone capable of collecting sound;
    an external output unit configured to output a picture imaged by the imaging element and sound collected by the microphone to the external apparatus;
    an operation unit configured to receive an input relating to operation; and
    a controller, wherein
    the controller
    controls switching between a first imaging mode in which the optical system is driven and a second imaging mode in which the optical system is driven at a higher speed than a speed in the first imaging mode, and
    allows switching to the first imaging mode by the operation unit when detecting that output to the external apparatus is enabled in the external output unit.

2. The imaging apparatus according to claim 1, wherein the optical system includes a correction lens for correcting an image blur, and
    the correction lens is driven at a higher speed in the second imaging mode than a speed in the first imaging mode.

3. The imaging apparatus according to claim 1, wherein the imaging element is driven in the first imaging mode, and
    the imaging element is driven at a higher speed in the second imaging mode than a speed in the first imaging mode.

4. An imaging apparatus for outputting an image and sound to an external apparatus, the imaging apparatus comprising:
    an optical system including a focus lens, a zoom lens and a diaphragm;

an imaging element configured to image an object image formed by the optical system;

a microphone capable of collecting sound;

an external output unit configured to output a picture imaged by the imaging element and sound collected by the microphone to the external apparatus;

an operation unit configured to receive an input relating to operation; and a controller, wherein the controller controls switching between a first imaging mode in which the imaging element is driven and a second imaging mode in which the imaging element is driven at a higher speed than a speed in the first imaging mode, and allows switching to the first imaging mode by the operation unit when detecting that output to the external apparatus is enabled in the external output unit.

5. An imaging apparatus body for outputting an image and sound to an external apparatus and for mounting an interchangeable lens that includes an optical system including a focus lens, a zoom lens and a diaphragm, the imaging apparatus body comprising:

an imaging element configured to image an object image formed by the optical system;

a microphone capable of collecting sound;

an external output unit configured to output a picture imaged by the imaging element and sound collected by the microphone to the external apparatus;

an operation unit configured to receive an input relating to operation; and a controller, wherein the controller controls at least one of switching between a first imaging mode in which the optical system is driven and a second imaging mode in which the optical system is driven at a higher speed than a speed in the first imaging mode and switching between a first imaging mode in which the imaging element is driven and a second imaging mode in which the imaging element is driven at a higher speed than a speed in the first imaging mode, and allows switching to the first imaging mode by the operation unit when detecting that output to the external apparatus is enabled in the external output unit.

6. An image and sound output method in an imaging apparatus that includes an optical system including a focus lens, a zoom lens and a diaphragm, and an imaging element configured to image an object image formed by the optical system, the imaging apparatus having at least one of a first mode group having a first imaging mode in which the optical system is driven and a second imaging mode in which the optical system is driven at a higher speed than a speed in the first imaging mode, and a second mode group having a first imaging mode in which the imaging element is driven and a second imaging mode in which the imaging element is driven at a higher speed than a speed in the first imaging mode, the imaging apparatus being configured for outputting an image and sound to an external apparatus, the image and sound output method comprising:

detecting whether or not output to the external apparatus is possible, and allowing switching to the first imaging mode when detecting that the output to the external apparatus is enabled.

* * * * *